June 2, 1925.  1,539,826

W. H. BOUTELLE

END PIECE CLAMPING MEANS

Filed Nov. 14, 1923

INVENTOR
W. H. Boutelle.
BY
Harry H. Styll
ATTORNEY

Patented June 2, 1925.

1,539,826

UNITED STATES PATENT OFFICE.

WILLIAM H. BOUTELLE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

END-PIECE-CLAMPING MEANS.

Application filed November 14, 1923. Serial No. 674,751.

*To all whom it may concern:*

Be it known that I, WILLIAM H. BOUTELLE, a citizen of the United States, residing at Southbridge, in the county of Worcester and State of Massachusetts, have invented certain new and useful Improvements in End-Piece-Clamping Means, of which the following is a specification.

The present invention relates to an ophthalmic mounting and has particular reference to an end-piece clamping means therefor.

An important object of the invention is to provide end-piece clamping means that will securely clamp the said end-pieces in the desired position, said clamping means being so formed that it will be absolutely impossible for the same to become accidentally displaced.

Another very important object of the invention is to provide an end-piece clamping means of this nature that may be used to clamp the end-pieces in any desired adjustment, which adjustment will at all times be maintained until purposely moved.

Another very important object of the invention is to provide an end-piece clamping means of this nature that will be strong, durable, very simple and inexpensive in construction and is well adapted to the purposes for which it is designed.

Other objects and advantages of the drawings will become apparent during the course of the following description.

Figure 1:
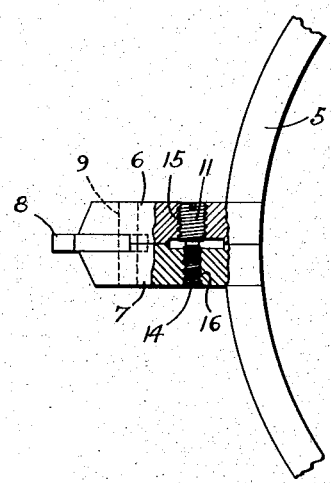
Figure 2:
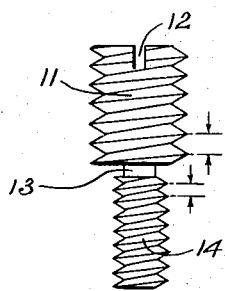
Figure 3:
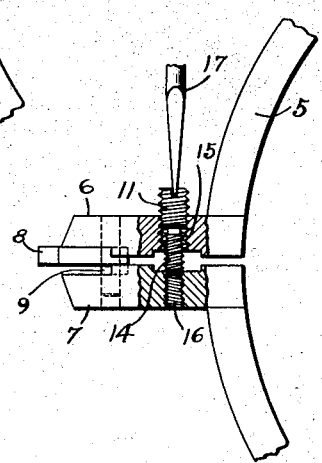
Figure 4:
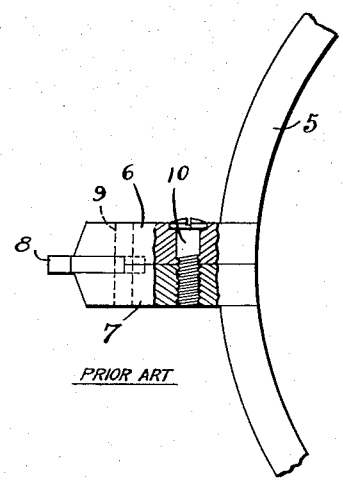

In the drawings wherein like numerals are employed to designate like parts throughout the same, Figure 1 is a front elevation partly in section, of an ophthalmic mounting showing my invention in use, Figure 2 is an enlarged elevation of my invention, Figure 3 is a fragmentary sectional detail illustrating my invention before it has been put into adjusted position, and Figure 4, which is a front elevation of an ophthalmic mounting partly in section for purposes of illustration, shows the prior art construction.

In the drawings, wherein for the purposes of illustration is shown the preferred embodiment of the invention, the numeral 5 designates an ophthalmic eye-piece which carries at its ends the end-pieces 6 and 7 respectively, between which is clamped the temple 8, which is pivotally mounted on the pin 9.

In Figure 4 of the drawings is shown the prior art construction wherein the end-pieces 6 and 7 are clamped together by means of the screw 10, which passes through aligned screw threaded apertures formed in the end-pieces 6 and 7. It will be noticed that the screw 10 is of the same diameter throughout its entire length. Through wear, the screw 10 has a tendency to work loose, thus allowing the end-pieces 6 and 7 to separate, after which the lens will be free to a certain extent to become displaced from its original setting. Especially in the case of lenses having a cylindrical power adapted for the correction of astigmatism, it is absolutely necessary that the lens be at all times disposed in its initial position or its effective power will be lost. It will thus be seen that when the screw 10 has become slightly displaced and the lens moved, that a great inconvenience has been endured which cannot possibly be present when the present invention is used.

In Figure 2 of the drawings is shown a large detail of a form of screw used in connection with the present invention and comprises a head portion 11 which is provided with a slot 12 to allow its rotation. Formed integral with the head portion 11 is a reduced body portion 13, while a reduced tail portion 14, preferably of the diameter of the body portion 13 is carried thereby. The head portion 11 and the tail portion 14 are provided with screw threads, the screw threads of the head portion 11 being of a greater pitch than the screw thread of the tail portion 14. I have found that 64 threads per inch on the head 11 and 90 threads per inch on the tail piece 14 will be entirely satisfactory, but of course I don't wish to limit myself to these numbers. When this form of screw is used the end-piece 6 will be provided with the screw threaded aperture 15, which will accommodate the threads of the head portion 11 while the end-piece 7 will be provided with the screw threaded aperture 16 adapted to accommodate the tail piece 14.

In use, the screw will be started as shown in Figure 3 of the drawings, by means of a suitable screw driver or the like 17. Of course, the tail-piece 14 will pass through the aperture 15 and will start in the aperture 16. At the same time the head portion 11 will become started in the aperture 15 and upon rotation of the screw driver 17, the screw may be sent home, thus thoroughly clamping the end-pieces 6 and 7 as is shown in Figure 1. The screw may be tightened to any adjustment required, but in view of the fact that the tail-piece 14 and the head portion 11 are provided with screw threads of different pitches, it will be utterly impossible for the said screw to work loose accidentally. In view of this fact, it will be seen that a lens may be placed in the eye-piece 5 without fear of the lens working loose and causing bad effects to the eye by incorrect positioning of the said lens. In other words, the screw will act as a clamping and a locking means for the end-pieces.

It is to be understood that the form of my invention herewith shown and described is to be taken as the preferred embodiment of the same and that various changes in the shape, size and arrangement of parts may be resorted to without departing from the spirit of my invention or the scope of the sub-joined claims.

Having thus described my invention, I claim:

1. An end-piece clamping means of the character described comprising a screw threaded head-piece, a screw threaded tail-piece, the screw threads of the said head- and tail-pieces being of different pitches.

2. An end-piece clamping means of the character described comprising a screw threaded head-piece and screw threaded tail-piece carried thereby, the said threads of the head-piece being of a greater pitch than those of the tail-piece.

3. In combination with an ophthalmic mounting including end-pieces having different sized aligned screw threaded apertures formed therethrough of a screw having an enlarged screw threaded head and a reduced screw threaded tail-piece, the said threads of the tail-piece and head-piece being of different pitches, said screw being adapted to be received within the said aligned apertures.

WILLIAM H. BOUTELLE.